United States Patent
Brevick

(10) Patent No.: US 7,530,924 B2
(45) Date of Patent: May 12, 2009

(54) TORQUE CONVERTER BYPASS CLUTCH CONTROL

(75) Inventor: John E. Brevick, Livonia, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 346 days.

(21) Appl. No.: 11/405,660

(22) Filed: Apr. 17, 2006

(65) Prior Publication Data

US 2007/0243971 A1  Oct. 18, 2007

(51) Int. Cl.
*B60W 10/02* (2006.01)
*B60W 10/04* (2006.01)

(52) U.S. Cl. .......................... 477/176; 477/57; 477/64; 477/77; 477/83; 477/169; 477/177; 477/180; 477/181

(58) Field of Classification Search .................. 477/57, 477/70, 77, 83, 62, 64, 168, 169, 174, 175, 477/176, 177, 180, 181; 701/67
See application file for complete search history.

(56) References Cited

U.S. PATENT DOCUMENTS

| | | | |
|---|---|---|---|
| 5,662,552 A | 9/1997 | Fukasawa et al. | |
| 5,733,223 A | 3/1998 | Matsubara et al. | |
| 5,916,293 A | 6/1999 | Katakura et al. | |
| 6,022,294 A | 2/2000 | Saito et al. | |
| 6,066,072 A * | 5/2000 | Adachi | 477/176 |
| 6,085,136 A | 7/2000 | Katakura et al. | |
| 6,565,483 B2 | 5/2003 | Segawa et al. | |
| 6,637,566 B2 | 10/2003 | Takatori et al. | |
| 6,652,415 B2 * | 11/2003 | Segawa et al. | 477/62 |
| 6,780,140 B2 | 8/2004 | Okamoto et al. | |
| 6,928,357 B2 * | 8/2005 | Higashimata et al. | 701/87 |
| 7,085,640 B2 * | 8/2006 | Segawa et al. | 701/67 |
| 7,195,581 B2 * | 3/2007 | Segawa et al. | 477/180 |

* cited by examiner

*Primary Examiner*—David D. Le
(74) *Attorney, Agent, or Firm*—David B. Kelley; MacMillan, Sobanski & Todd, LLC

(57) ABSTRACT

A method of using a torque converter bypass clutch to launch a vehicle, mitigate transient vibration, and mitigate vehicle natural frequency harshness. The method uses the torque converter when the bypass clutch power capacity is approaching its limit, when the vehicle load is high, or the vehicle is on a grade, where normally the bypass clutch would launch the vehicle.

13 Claims, 5 Drawing Sheets

TORQUE CONVERTER BYPASS CLUTCH CONTROL

BACKGROUND OF THE INVENTION

The present invention relates generally to controlling the bypass clutch of a torque converter for an automotive vehicle.

A conventional automatic transmission includes a torque converter, located in the power path between an engine crankshaft and transmission input shaft. A torque converter includes a bladed impeller wheel driveably connected to the engine crankshaft, a bladed turbine wheel driveably connected to the transmission input shaft, a bladed stator wheel, and a toroidal chamber containing pressurized hydraulic fluid for producing a hydrokinetic connection between the impeller and turbine. The torque converter attenuates torque transients and vibrations, increases torque transmitted to the turbine from the impeller at low speed, and provides a smooth transition during gear ratio changes. Because of slippage between the input and output, the torque converter has a low operating efficiency.

Current automotive automatic transmissions use a converter bypass clutch to improve fuel economy primarily at highway vehicle speed. When the bypass clutch is fully engaged, it produces a mechanical drive connection between the impeller and turbine, thereby replacing the hydrokinetic drive connection. When the bypass clutch is fully disengaged, the mechanical drive connection is functionally replaced by the hydrokinetic drive connection. Usually a spring damper arranged in series with the bypass clutch is used to reduce engine torque fluctuation transmitted to the driveline. However, the bypass clutch, damper, control and strategy are usually not optimized to produce maximum fuel economy under city driving conditions.

There is a need for the torque converter, its bypass damper, bypass clutch, and control strategy to participate toward improving performance feel during certain transient conditions and to contribute more toward improvement in fuel economy under in city driving conditions. It is preferred that improved fuel economy and performance be realized without employing new automatic transmission architecture, such as the dual wet or dry input clutches used in powershift transmissions to replace and simulate the performance of the torque converter.

SUMMARY OF THE INVENTION

In one embodiment, the torque converter bypass clutch is used to launch the vehicle, and the bypass clutch is locked or modulating slip during the full city driving cycle. The control strategy is appropriate for truck applications because it has a torque converter available for use in high load conditions.

The control is preferably, but not exclusively applied to a torque converter that includes a damper having dual stage springs, a multi-plate clutch actuated by a closed piston and a variable force solenoid. The torque converter control produces improved fuel economy; pleasing performance and feel; and excellent noise, vibration and harshness characteristics.

In various embodiments, the control is applicable to participate in vehicle launch, transient events, and lugging, all of which require special attention when operating a vehicle on a typical light duty drive cycle without the torque converter being open. The torque converter, operating under this control strategy can be used during aggressive driving, while pulling heavy loads, or in severe off-road driving conditions.

In one embodiment of this invention for controlling the bypass clutch of a torque converter during an event, a first function for determining target clutch slips during the event is defined, and a second function for determining target wheel torques during the event is defined. An updated target clutch slip is determined repetitively from the first function, and an updated target wheel torque is determined repetitively from the second function. The torque capacity of the clutch and the engine output torque are changed such that the current wheel torque becomes aligned more closely with the target wheel torque.

In another embodiment of the invention, a first function for determining target clutch slips during the event is defined. An updated target clutch slip is determined repetitively from the function. The torque capacity of the clutch is changed such that the current clutch slip becomes aligned more closely with the target clutch slip.

The method improves city drive schedule fuel economy.

The description and specific examples, although indicating preferred embodiments of the invention, are given by way of illustration only. Various changes and modifications to the described embodiments and examples will be apparent to those skilled in the art.

DESCRIPTION OF THE DRAWINGS

These and other advantages will become readily apparent to those skilled in the art from the following detailed description of the preferred embodiment when considered in the light of the accompanying drawings in which.

DESCRIPTION OF THE PREFERRED EMBODIMENT

Figure 1:
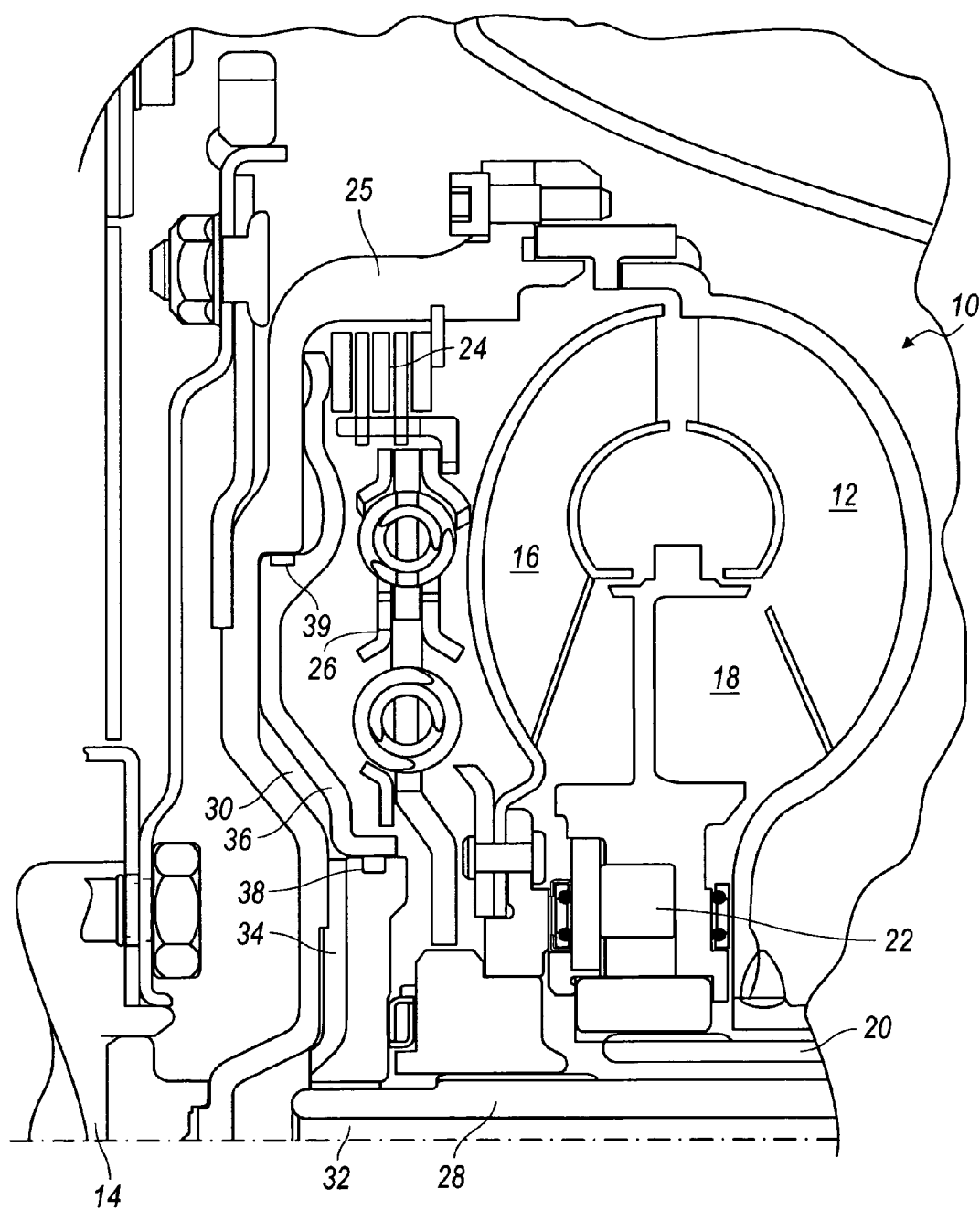
FIG. 1 is a cross section of a torque converter to which the control strategy can be applied.

Referring first to FIG. 1, a torque converter 10 includes a bladed impeller wheel 12 connected to the crankshaft 14 of an internal combustion engine, a bladed turbine wheel 16, and a bladed stator wheel 18. The impeller, stator and turbine wheels define a toroidal fluid flow circuit, whereby the impeller is hydrokinetically connected to the turbine. The stator 18 is supported rotatably on a stationary stator sleeve shaft 20, and an overrunning brake 22 anchors the stator to shaft 20, thereby preventing rotation of the stator in a direction opposite the direction of rotation of the impeller, although freewheeling motion in the opposite direction is permitted.

The torque converter assembly 10 includes a bypass clutch 24 located within the torque converter housing 25. The torque output side of lockup clutch 24 includes a damper 26, located between the impeller and a turbine shaft, which is the transmission input shaft 28. The damper 26 may incorporate dual or single-stage compression springs.

The damper 26 is directly connected at one end to the turbine 16 and at the other end to input shaft 28. The bypass clutch 24 is connected between the housing 25 and damper 26. When clutch 24 is slipping, i.e., there is a speed difference across the clutch, it attenuates transitory torque fluctuations from the crankshaft 14 to input shaft 28. When the clutch is disengaged, the torque converter can mitigate transient torque disturbances.

The clutch 24 is alternately engaged and disengaged in accordance with the magnitude of clutch apply pressure communicated to a hydraulic cylinder 30 through an axial passage 32 formed in the input shaft 28 and a radial passage 34. A closed piston 36, sealed on housing 25 by O-rings 38 and 39, moves rightward within the cylinder to force the clutch discs into mutual frictional contact, and leftward to allow the discs to disengage mutually.

When clutch 24 is engaged, the turbine and impeller are mechanically connected and hydrokinetically disconnected; when clutch 24 is disengaged, the turbine and impeller are hydrokinetically connected and mechanically disconnected. Fluid contained in the torque converter is supplied from the output of an oil pump and is returned to an oil sump, to which an inlet of the pump is connected hydraulically.

Figure 2:
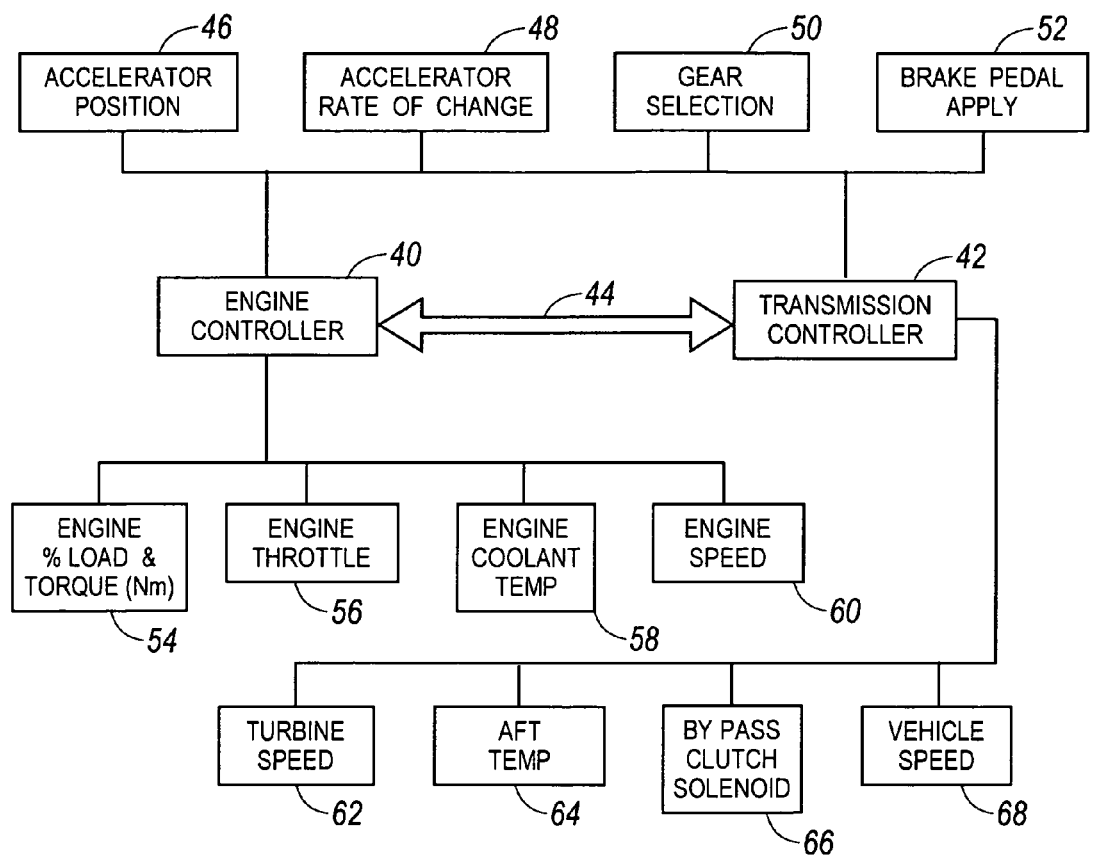
FIG. 2 is a schematic diagram that shows various sensors and actuators for use with the torque converter control strategy.

FIG. 2 shows various sensors and actuators that communicate with an engine controller 40 and transmission controller 42, which communicate mutually via multiplex communication messages. A signal produced by a sensor 46 represents displacement of an accelerator pedal, which is controlled manually by the vehicle operator and is a component of an electronic throttle control (ETC). The time rate of change of displacement of the accelerator pedal 48, preferably calculated between sampling intervals, is another controller input. A signal representing the selected range of a gear selector or PRNDL, also controlled manually by the vehicle operator, is produced by a sensor 50. A signal representing the state of the brake pedal, controlled manually by the vehicle operator, is produced by a sensor 52.

Other inputs to the engine controller 40 include signals produced by sensors representing intake mass air flow sensor and other engine operating parameters, from which engine load 54 and engine torque are determined; engine throttle position 56; engine coolant temperature 58; barometric pressure, accessory load, and engine speed 60. Other inputs to the transmission controller 42 include signals produced by sensors representing turbine speed 62; temperature of the automatic transmission fluid (ATF) 64; the magnitude of pressure that actuates the bypass clutch 24 or the corresponding magnitude of electric current supplied to a variable force solenoid that controls a bypass clutch valve 66; and vehicle speed (VS) 68, which is preferably determined from the speed of the transmission output shaft and the gear ratio of the final drive.

Figure 3:
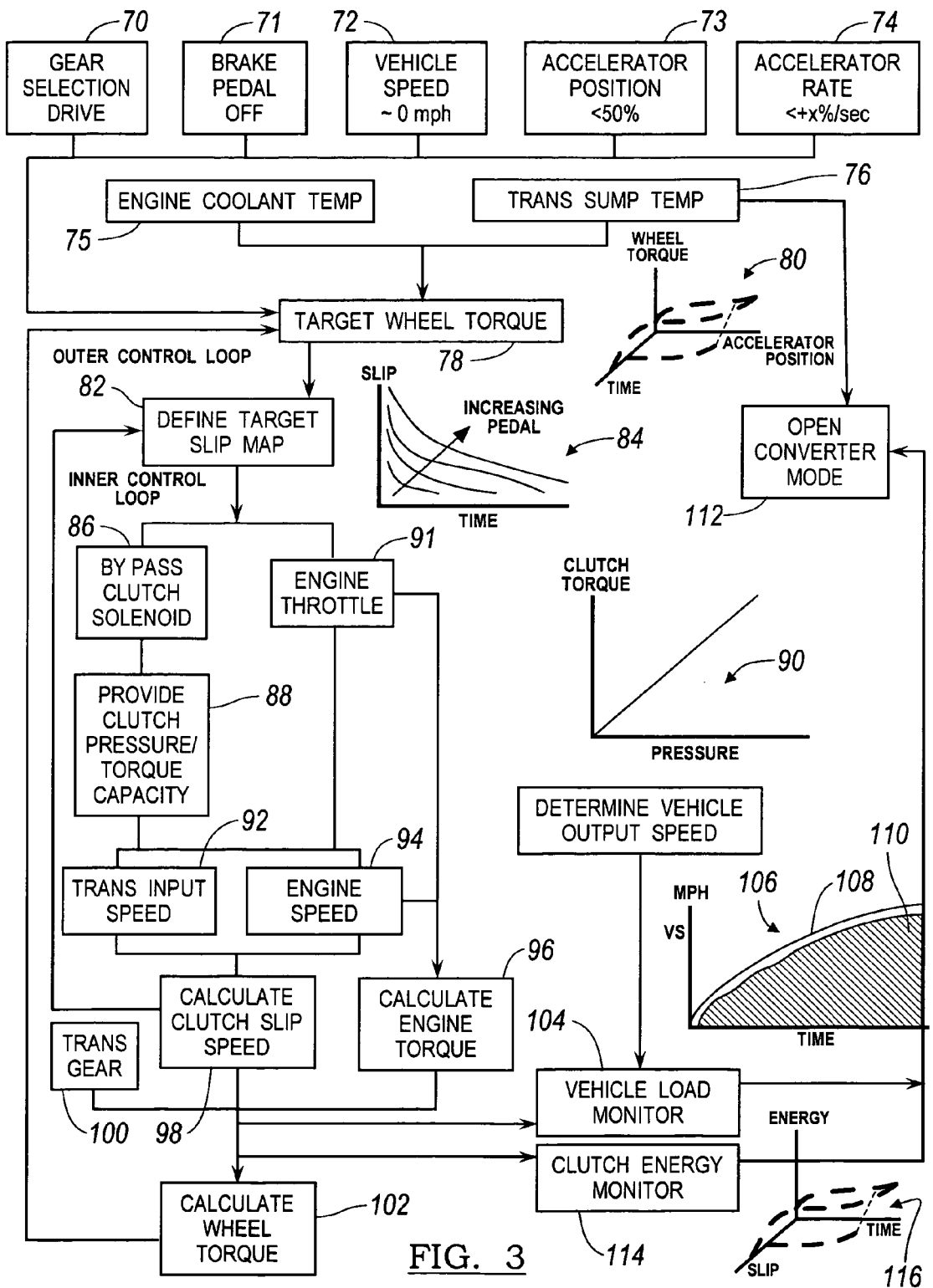
FIG. 3 is a schematic diagram illustrating steps for controlling the operating states of the bypass clutch during vehicle launch events.

FIG. 3 illustrates steps for controlling the operating states of the bypass clutch 24 during vehicle launch events. The clutch states include slipping, full engagement, and full disengagement. Vehicle launch is a term indicating the process of accelerating the vehicle from rest or a nearly stopped condition, usually in the lowest forward or reverse gear.

A launch event is detected when the following initial conditions are satisfied: the transmission is producing the lowest gear; the PRNDL is in the drive position 70: the brake pedal is off 71; VS is about zero 72; the accelerator pedal is displaced less than about one-half of its full travel 73; the time rate of change of accelerator pedal displacement is less than a reference rate 74; engine coolant temperature 75 is normal ambient or greater; and the temperature of ATF in transmission sump 76 is normal ambient or greater. The viscosity of ATF affects powertrain performance; therefore if ATF temperature is less than about 20° F. the torque converter is opened at step 112.

When the initial conditions are met, the launch control strategy begins at step 78, where a target wheel torque is determined. Target wheel torque, which is represented graphically by the function 80, is defined for a vehicle launch event with reference to the position or displacement of the accelerator pedal 46, and the current length of the period that begins at the start of the vehicle launch event.

At step 82, a target clutch slip is determined. Target clutch slip, which is represented graphically by the function 84, is defined for a vehicle launch event with reference to the displacement of the accelerator pedal 46, and the current length of the period that begins at the start of the vehicle launch event.

Both clutch slip and engine output torque can be used as modulated variables to control the clutch during a vehicle launch event. An inner control loop for determining the magnitude of current wheel torque and current clutch slip is entered. At step 86, the magnitude of current supplied to the bypass clutch solenoid is changed to align current clutch slip with the target wheel torque. At step 88, solenoid current supplied to the clutch solenoid causes clutch apply pressure to actuate piston 36, located in the cylinder 30 of the servo that actuates clutch 24. The torque capacity of clutch 24 corresponding to the apply pressure is produced as shown in the graph of function 90, which relates clutch apply pressure to clutch torque capacity. If engine output torque is to be a modulated variable, at step 91 the engine throttle opening is changed to align current wheel torque with the target wheel torque.

At step 92, transmission input shaft speed is determined from the output of sensor 62. At step 94, engine speed (NE) is determined from the output of sensor 60. At step 96, engine output torque is determined from engine throttle position 91 and engine speed 94.

At step 98, the current magnitude of clutch slip is calculated by subtracting transmission input speed 92 from engine speed 94. Current clutch slip is fed back to step 82, where the current accelerator pedal position and the current period length of the vehicle launch event are used with function 84 to determine an updated target clutch slip and to determine any change required to the electric current supplied to the clutch solenoid for a change in clutch torque capacity.

At step 100, the gear ratio in which the transmission is currently operating and the constant gear ratio of the final drive are determined. Wheel torque is calculated at step 102, as the product of the combined gear ratio 100 and engine torque 96. Wheel torque is fed back to step 78, where the current accelerator pedal position and the current period length of the vehicle launch event are used with function 80 to determine an updated target wheel torque clutch and to determine any change required to the engine throttle position. Then the control loop is executed again.

If current wheel torque 102 is greater than the target wheel torque 78, slip across the clutch 24 may be reduced by increasing clutch apply pressure. This reduces engine speed and torque, decreases the torque amplification produced by the hydrokinetics of the torque converter, and decreases wheel torque. If current wheel torque 102 is less than the target wheel torque 78, slip across the clutch 24 may be increased by decreasing clutch apply pressure. This raises engine speed and torque, increases the torque amplification produced by the hydrokinetics of the torque converter, and increases wheel torque. If wheel torque is greater than the target wheel torque, the engine throttle opening may be reduced and the magnitude of engine output torque is reduced. If wheel torque is less than the target wheel torque, the engine throttle opening may be increased, thereby increasing the magnitude of engine output torque. In these ways, clutch slip and engine output torque may be modulated to produce the target wheel torque during a vehicle launch.

The control procedure is repeated continually until the vehicle launch event terminates or until a clutch energy condition or a vehicle load condition occurs, as described below.

A vehicle load monitor 104 contains a function 106 relating vehicle speed (VS) 68 and time during the vehicle launch. The function 106 includes an expected, acceptable vehicle load line 108 and a range 110 below line 108, in which the vehicle is heavily loaded or on a grade. When vehicle speed is lower than an expected speed at the same time, the vehicle load status overrides the closed loop and causes control to pass to step 112, where the torque converter 10 is fully open, i.e., bypass clutch 24 is fully disengaged.

A clutch energy monitor 114 contains a clutch energy function 116, preferably determined empirically by measuring temperature at critical areas of bypass clutch 24 for a range of magnitudes of engine torque and clutch slip during the period while the clutch is slipping to control the vehicle launch. The current magnitude of energy being applied to the clutch while the clutch is slipping is calculated from the current engine torque 96 and the current slip speed 98. When current clutch energy is greater than the acceptable magnitude defined by function 116, control passes to step 112, where the torque converter 10 is fully open and bypass clutch 24 is fully disengaged, thereby discontinuing the supply of friction energy to the clutch.

The clutch 24 should be fully engaged or modulating to a desired slip speed after the transmission completes an upshift to second gear. If the vehicle is equipped with deceleration fuel shut-off capability, clutch 24 is fully engaged or modulating slip during a deceleration event to avoid stalling the engine.

Figure 4:
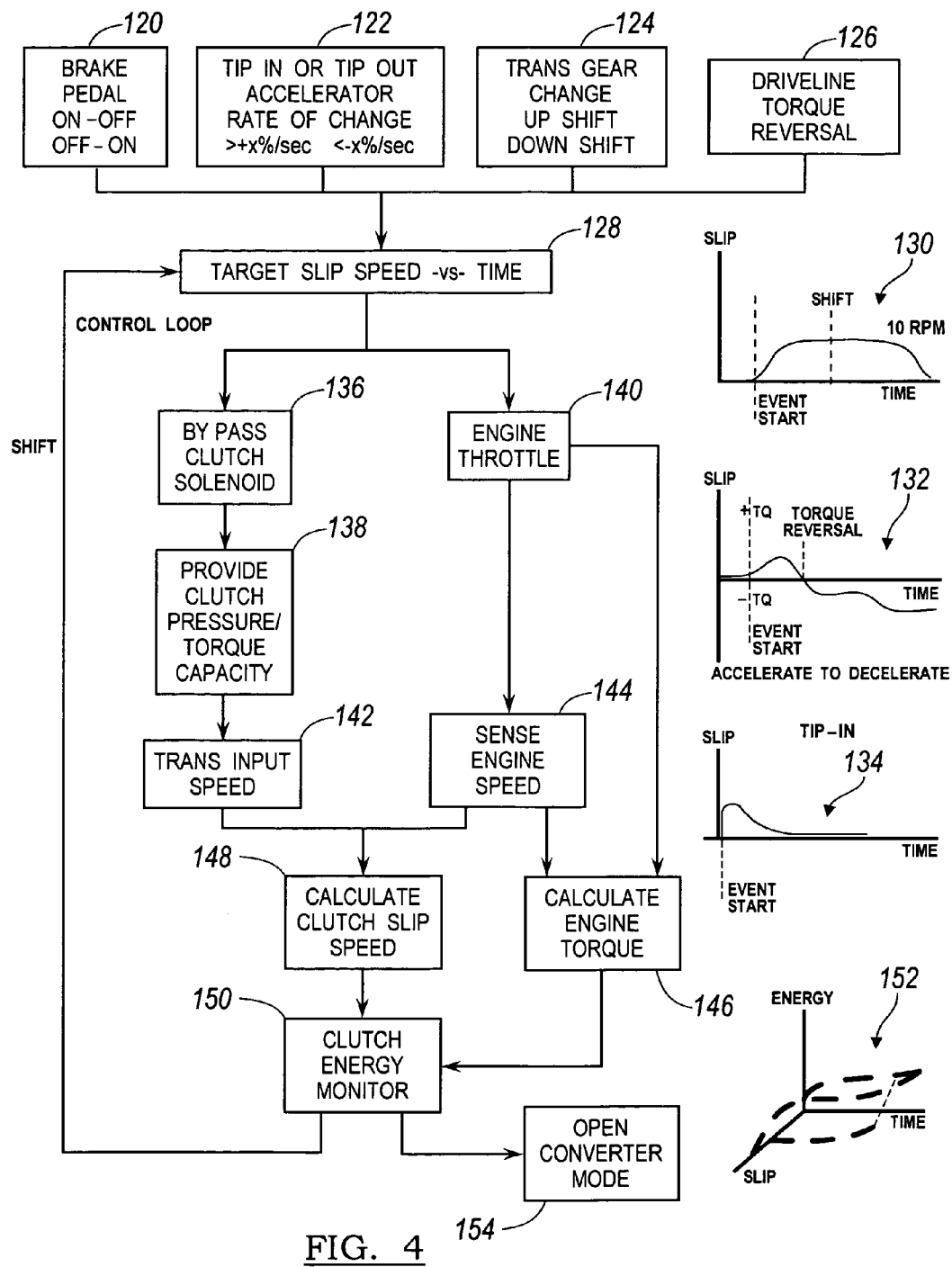
FIG. 4 is a schematic diagram illustrating steps for controlling the bypass clutch during a transient events.

Refer now to FIG. 4, where a strategy for controlling bypass clutch 24 and torque converter 10 during transient events is illustrated. A transient event is detected when any of the following initial conditions is satisfied: the status of the brake pedal is changed 120 between on and off states; the time rate of change of positive or negative accelerator pedal displacement is greater than a reference rate 122 indicating a tip-in or tip-out; an upshift or downshift between transmission gears has been commanded or is underway 124; or a driveline torque reversal is about to occur 126. A torque reversal is a change between a positive torque condition, wherein torque is transmitted from the engine through the driveline to the driven vehicle wheels, and a negative torque condition, wherein torque is transmitted from the vehicle wheels through the driveline to the engine.

When any of these or other transients is detected, control passes to step 128, where a target clutch slip is determined from the defined function 130, 132, 134 that corresponds to the detected transient. For example, function 130 applies to a gear shift event and shows the variation of target slip over time since the transient began, the maximum slip being about 10 rpm. Function 132 applies to a torque reversal event and shows the variation of target slip over time since that transient began. Function 134 applies to a tip-in event and shows the variation of target slip over time since the transient began, the maximum slip rising rapidly to about 50-100 rpm and declining exponentially thereafter.

Clutch slip and engine output torque can be modulated to produce the target clutch slip during a vehicle transient event. If clutch torque is to be a modulated variable, control passes to step 136, where the magnitude of electric current supplied to the bypass clutch solenoid is set such that clutch actuating pressure and the torque capacity of the clutch cause the current clutch slip to become aligned with the target clutch slip. At step 138, solenoid current is converted to the magnitude of apply pressure at clutch 24, and the magnitude of torque capacity of the clutch is determined from function 90 of FIG. 3, which relates clutch apply pressure to clutch torque capacity.

If engine output torque is to be a modulated variable, as it would be for a torque reversal transient 126, at step 140 engine output torque is ramped down to reduce the characteristic harshness called "clunk" that is associated with driveline lash and a torque reversal. At step 142, transmission input shaft speed is determined from the output of sensor 62. At step 144, engine speed is determined from the output of sensor 60. Engine output torque is determined at step 146 from the engine throttle position 140 and engine speed 144. At step 148, the current magnitude of clutch slip is calculated by subtracting transmission input speed 142 from engine speed 144. These data are fed back to step 128, where they are used with the appropriate function 130, 132, 134 to update the target clutch slip and to determine any required change to the clutch torque capacity and engine throttle position. Then the control loop is executed again. The control procedure is repeated continually until the transient event terminates or until a clutch energy condition occurs, as described below.

Clutch energy monitor 150 contains a clutch energy function 152, preferably determined empirically by measuring temperature at critical areas of bypass clutch 24 for a range of magnitudes of engine torque, clutch slip and the length of the period during which energy is supplied to the clutch 24. The magnitude of energy being applied to the clutch is determined from function 152 using independent variables time since beginning the transient control and current clutch slip. When current clutch energy is greater than the acceptable magnitude of clutch energy defined by function 152, control passes to step 154, where the torque converter 10 is fully open and bypass clutch 24 is fully disengaged.

If current clutch energy is less than the magnitude defined by function 152, the current slip speed 148 is fed back to step 128, where an updated target clutch slip is determined. The transient control strategy then minimizes clutch slip error by either increasing clutch apply pressure to reduce current clutch slip to the target slip, by reducing clutch apply pressure to increase current clutch slip to the target slip, or by modulating engine output torque to reduce engine throttle position, as discussed above for a torque reversal transient.

Figure 5:
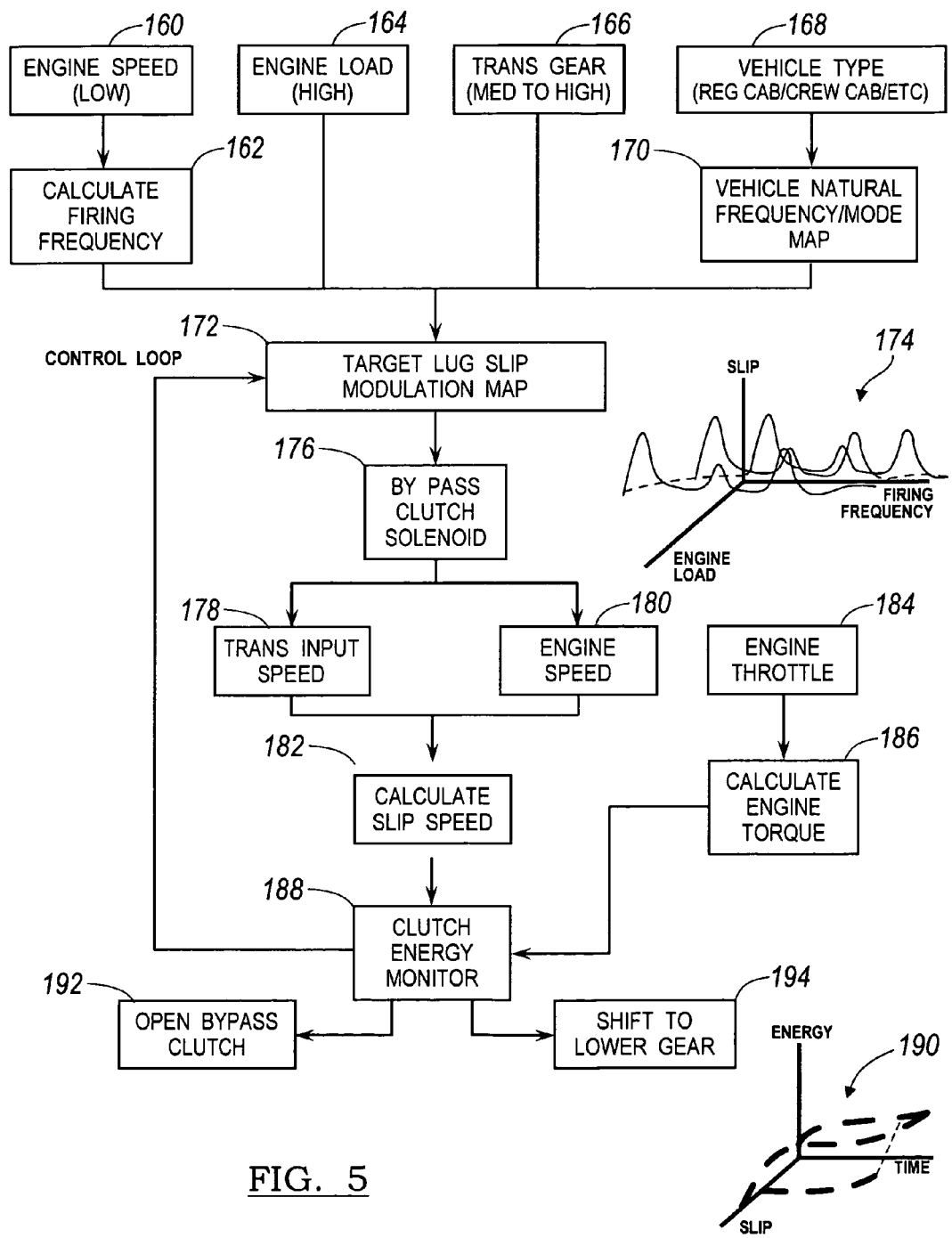
FIG. 5 is a schematic diagram illustrating steps for controlling the bypass clutch to avoid powertrain torque transients occurring at modal or resonant frequencies of the vehicle.

Refer now to FIG. 5, where a strategy for controlling bypass clutch 24 and torque converter 10 to avoid engine torque fluctuation (firing frequency) forcing functions occurring at or near known resonant frequencies of the vehicle is illustrated. Such events, as perceived by the vehicle passengers are called "boom" or "moan" during lugging operation. Lugging refers to powertrain operation at low engine speed, high transmission gears, and high engine load. The lugging event control is initiated when the following initial conditions are present: engine speed is low 160 causing the engine ignition firing frequency 162 of an gasoline engine or combustion frequency of a diesel engine to be determined with reference to the engine speed produced by sensor 60 and the number of currently operating cylinders; engine load is high 164; and the transmission is operating in a mid to high range gear 166, e.g. in third through sixth gear of a six-speed transmission. Each vehicle type 168 will have had a natural frequency/mode map 170 defined and available to the controller. These data are used at step 172, where a defined target lugging slip modulation function 174 is used to determine a target clutch slip. The target clutch slip function 174 defines peak amplitudes, which occur over the range of the engine firing frequency at the frequencies corresponding to the vehicle natural frequency/mode map 170. Function 174 illustrates that the target slip amplitude increases with an increasing magnitude of engine load.

When lugging control begins, control passes to step 172, where the target clutch slip for the current firing frequency 162 and current engine load 54 are determined from frequency map or function 174. At step 176, the magnitude of electric current supplied to bypass clutch solenoid is set such that the clutch-apply pressure and the corresponding clutch torque capacity produce the target clutch slip, as defined by function 90.

At step 178, transmission input shaft speed is determined from the output of sensor 62. At step 180, engine speed is determined from the output of sensor 60. At step 182, the current magnitude of clutch slip is calculated by subtracting transmission input speed 178 from engine speed 180.

At step 184, the engine throttle position is determined from the output of sensor 56. Engine output torque is determined at step 186 from engine throttle position 182 and engine speed 180.

Clutch energy monitor contains a clutch energy function 190, preferably determined empirically by measuring temperature at critical areas of bypass clutch 24 for a range of magnitudes of engine torque and clutch slip. The magnitude of energy currently being applied to clutch 24 is determined at step 188 for the current engine torque 186 and current clutch slip 182 and compared the clutch energy defined by function 190.

If the magnitude of energy applied to the clutch during the lugging control becomes greater than the acceptable magnitude of energy defined by function 190, control passes either to step 192, where the torque converter 10 is fully open and bypass clutch 24 is fully disengaged, or preferably to step 194, where a shift to another gear occurs.

If the magnitude of energy applied to the clutch during the lugging control is less than the acceptable magnitude of energy defined by function 190, current clutch slip 182 is fed back to step 172, where target clutch slip is updated and any change required to clutch torque capacity to align current clutch slip with the updated clutch slip is determined. The control strategy then minimizes clutch slip error by either increasing clutch apply pressure to reduce current clutch slip to the target slip, or by reducing clutch apply pressure to increase current clutch slip to the target slip.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for controlling a bypass clutch of a torque converter, comprising:
   defining a first funtion from which a target clutch slip is updated with reference to a current length of a clutch control event;
   defining a second function from which a target wheel torque is updated during the event;
   reducing a difference between a current wheel torque and the target wheel torque by one of producing the target clutch slip and changing an engine operating parameter.

2. The method of claim 1 further comprising:
   defining a third function from which an occurrence of a vehicle overload condition can be determined; and
   disengaging the clutch to open the torque converted when the vehicle overload condition occurs.

3. The method of claim 1 further comprising:
   defining a third function for a vehicle launch event that relates vehicle speed and a length of a period starting at the beginning of the vehicle launch event from which an occurrence of a vehicle high load condition can be determined;
   determining current vehicle speed;
   determining the length of the period starting at the beginning of the vehicle launch event to a current time;
   using the current vehicle speed and said period length to determine from the third function whether the vehicle high load condition occurs; and
   disengaging the clutch to open the torque converted when the vehicle high load condition occurs.

4. The method of claim 1 further comprising:
   defining a fourth function from which an occurrence of a clutch energy condition can be determined; and
   disengaging the clutch to open the torque converter when the clutch energy condition occurs.

5. The method of claim 1 further comprising:
   defining a fourth function from which an occurrence of a clutch energy condition can be determined for a lugging event; and
   shifting the transmission to a lower gear than a current gear when the clutch energy condition occurs.

6. The method of claim 1 further comprising:
   defining a fourth function that relates clutch slip, the current length of the event and a engine output torque from which an occurrence of a clutch energy condition can be determined;
   determining the current length of the event;
   determining a current magnitude of the engine output torque;
   determining a current vehicle slip;
   using current vehicle slip, the current length of the event, and the current magnitude of the engine output torque to determine from the fourth function whether the clutch energy condition occurs; and
   disengaging the clutch to open the torque converter when the clutch energy condition occurs.

7. A method for controlling a bypass clutch of a torque converter connected to an engine, comprising:
   (a) defining a function applicable during a clutch control event from which a target clutch slip is updated based on at least one of a current length of the event and a current engine loading;
   (b) using the function to update the target clutch slip during the event;
   (c) changing a torque capacity of the clutch to produce an updated target clutch slip such that a current clutch slip becomes aligned more closely with the updated target clutch slip;
   (d) defining a second function from which an occurrence of a clutch energy condition can be determined for a lugging event; and
   (e) shifting the transmission to a lower gear than a current gear when the clutch energy condition occurs.

8. The method of claim 7 wherein step (a) further comprises:
   determining a target clutch slip having a peak amplitude at each firing frequency of the engine over a range of engine loading.

9. The method of claim 7 wherein:
   step (b) further comprises:
   determining at least one frequency at which a vibration amplitude peaks occurs in the vehicle;

defining, over a range of engine loading, one of the target clutch slip having an amplitude peak at said frequency; and step (c) further comprises:
  determining a current engine firing frequency;
  determining a current engine loading;
  using the current engine firing frequency and the current engine loading to determine from the function the target clutch slip.

10. The method of claim 7 wherein the event is an engine torque transient event:

step (a) further comprises:
  determining a target clutch slip that varies over a period of the transient event; and step (b) further comprises:
  determining a current magnitude of accelerator pedal displacement;
  determining a current length of a period that began at the start of the transient event; and
  using the current magnitude of accelerator pedal displacement and the current period length of the transient event to determine from the function the target clutch slip.

11. The method of claim 7 wherein:

step (a) further comprises:
  determining a target clutch slip that varies with a magnitude of accelerator pedal displacement over a period of a vehicle launch event; and step (c) further comprises:
  determining a current length of a period that began at the start of the vehicle launch event; and
  using the current period length of the vehicle launch event to determine from the function the target clutch slip.

12. The method of claim 7 further comprising:

defining a second function from which the occurrence of a clutch energy condition can be determined; and disengaging the clutch to open the torque converter when the clutch energy condition occurs.

13. The method of claim 7 further comprising:

defining a second function for a vehicle launch event that relates clutch slip, a length of a period starting at the beginning of the vehicle launch event and an engine output torque from which an occurrence of a clutch energy condition can be determined;

determining the length of the period starting at the beginning of the vehicle launch event;

determining a current magnitude of engine output torque;

using current vehicle speed, said period length and the engine output torque to determine from the second function whether the clutch energy condition occurs; and disengaging the clutch to open the torque converter when the clutch energy condition occurs.

* * * * *